INVENTOR.
Bernard Lewis Evering

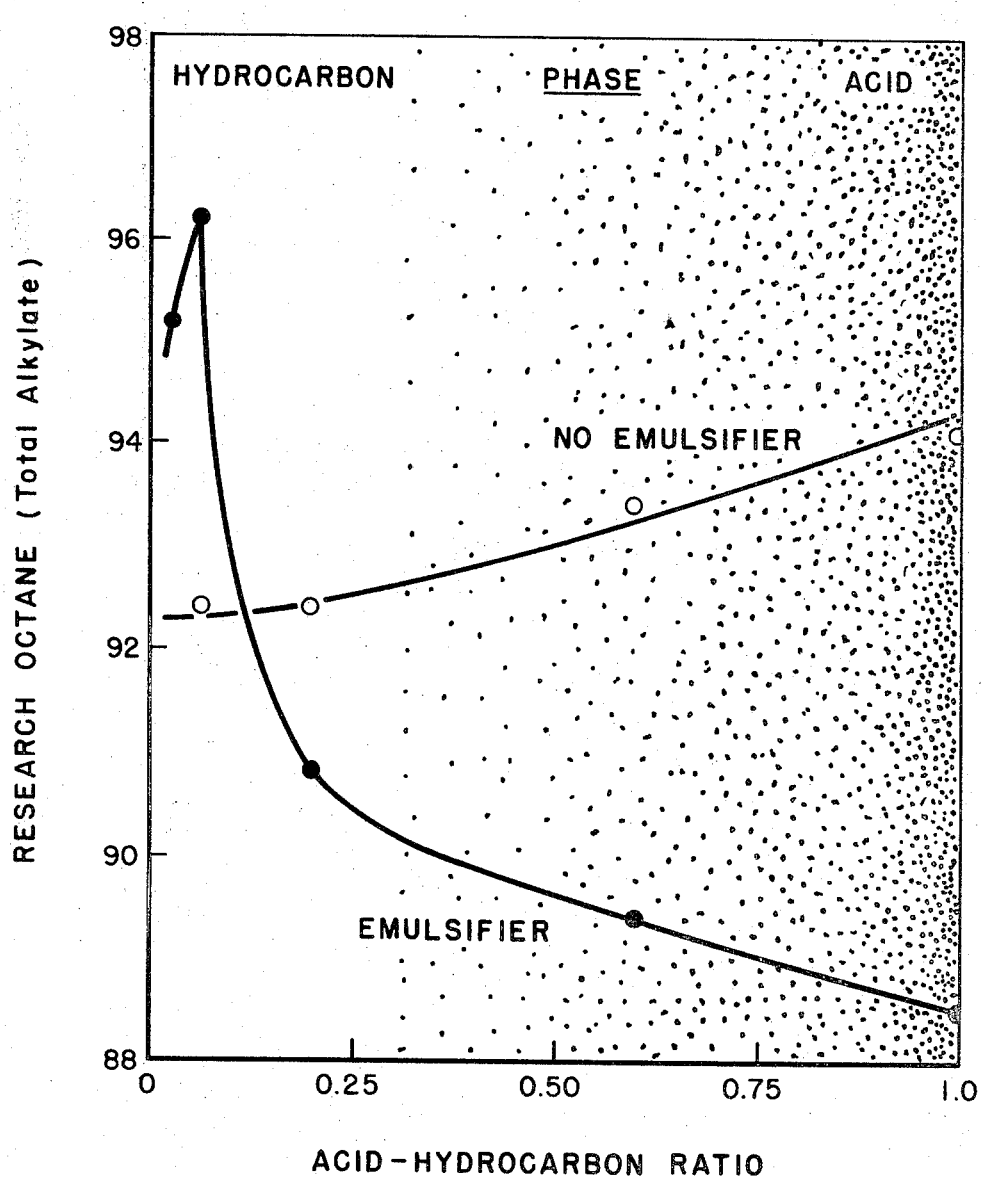

United States Patent Office 3,551,514
Patented Dec. 29, 1970

3,551,514
PROCESS FOR ALKYLATING ISOPARAFFINS WITH SULFURIC ACID AND AN EMULSIFYING AGENT
Bernard Lewis Evering, Chicago, Ill., assignor to Standard Oil Company, Chicago, Ill., a corporation of Indiana
Filed Sept. 23, 1968, Ser. No. 761,507
Int. Cl. C07c 3/54
U.S. Cl. 260—683.59
10 Claims

ABSTRACT OF THE DISCLOSURE

An improved process for reacting isoparaffins such as isobutane with monoolefins such as isobutylene in the presence of a sulfuric acid catalyst of a predetermined acid strength to produce alkylated isoparaffins comprising carrying out the reaction with an acid to hydrocarbon ratio of from 0.033 to 0.10 with the sulfuric acid having added thereto from 0.2 to 1.5 percent by weight of an emulsifying agent.

---

Figure 1:
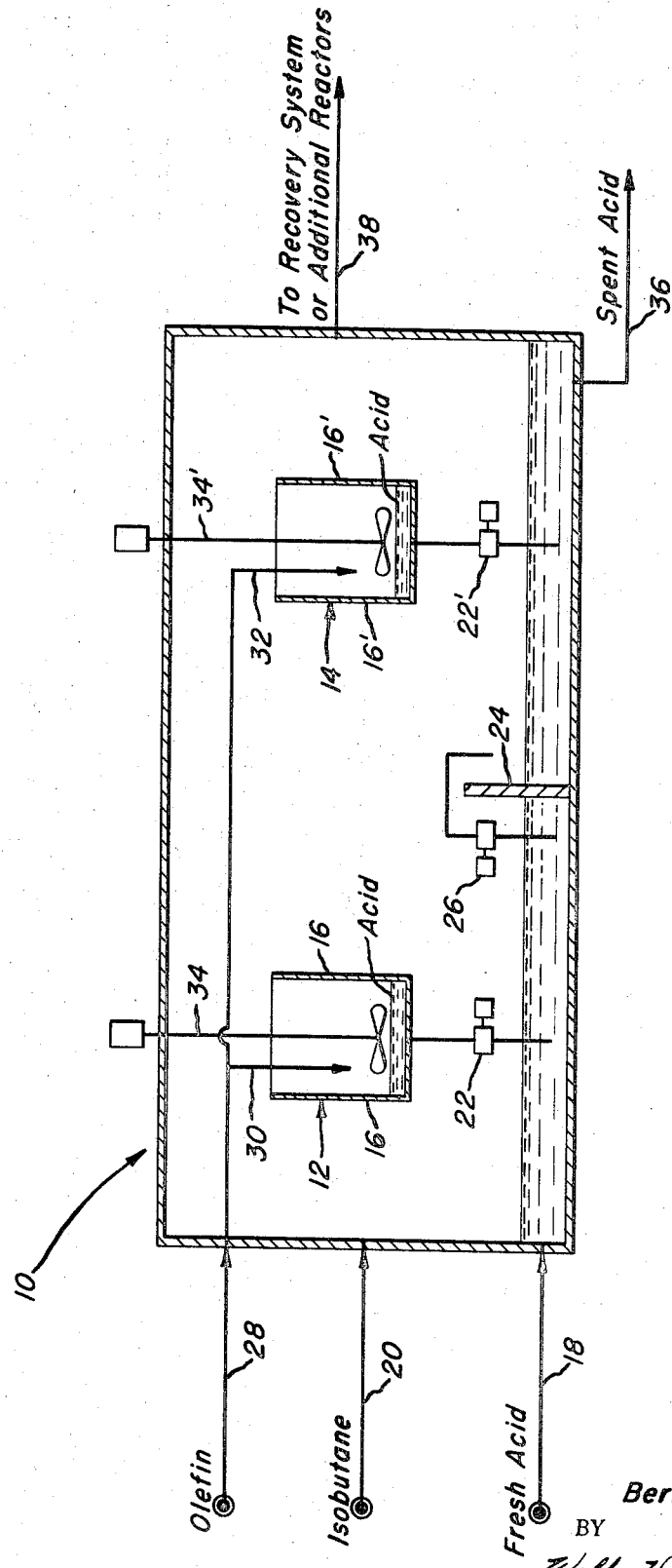

This invention relates to alkylation reactions and, more particularly, to an improved alkylation process wherein a sulfuric acid catalyst is maintained in a hydrocarbon continuous phase.

Many different processes have been developed for converting normally gaseous hydrocarbons into hydrocarbons with higher molecular weights that can be used as motor fuels. Among these processes, the prior art has utilized alkylation reactions that are catalyzed by sulfuric acid. Such a reaction, in general, comprises reacting a light olefin with an isoparaffin in the presence of the acid catalyst.

The amount of sulfuric acid that is present has, as is well known, an important bearing on the quality of the alkylate formed. If the reaction mixture contains less than 40 percent acid by volume, an acid-in-hydrocarbon emulsion is formed. Above this 40 percent inversion point, a hydrocarbon-in-acid emulsion is formed.

It is almost universally believed that the latter type of emulsion both produces a better alkylate product and minimizes the amount of acid that is required per pound of alkylate product. Accordingly, an acid volume of from 60 to 70 percent is typically maintained in alkylation reactions. While an emulsifying agent or surface active agent has sometimes been used to assist in maintaining the desired hydrocarbon-in-acid emulsion, such agents are usually avoided because the increase in emulsion stability hinders the separation and settling of the product being formed.

It is an object of the present invention to provide an improved alkylation process using an acid catalyst characterized by reduced acid consumption and a capability of producing a more selective alkylate product.

A further object is to provide an alkylation process of the above-identified type wherein higher temperatures may be employed without significantly impairing the alkylate quality.

A still further object of the present invention is to provide an improved alkylation process wherein a lower isoparaffin to monoolefin ratio may be employed.

Other objects and advantages will be apparent from the accompanying description of the invention which follows, taken in connection with the drawings in which:

FIG. 1 is a schematic view of a reactor that may be employed to carry out the improved process of the present invention; and FIG. 2 is a graph demonstrating the affect on the octane number of varying the ratio of the acid catalyst to the isoparaffin, with and without an emulsifying agent present.

While the invention is susceptible of various modifications and alternative forms, specific embodiments thereof have been shown by way of example and will herein be described in detail. It should be understood, however, that it is not intended to limit the invention to the particular forms disclosed, but, on the contrary, the invention is to cover all modifications, equivalents and alternatives falling within the spirit and scope of the invention as expressed in the appended claims.

In accordance with the present invention there is provided an improved process for reacting isoparaffins with monoolefins in the presence of sulfuric acid as a catalyst to produce alkylated isoparaffins. The improvement comprises conducting the alkylation reaction with a sulfuric acid to isoparaffin ratio of from about 0.033 to about 0.10 with the sulfuric acid being suspended as an emulsion in an isoparaffin continuous phase. The sulfuric acid has added thereto from about 0.2 to 1.5 percent, based upon the weight of the sulfuric acid, of an emulsifying agent. The acid strength should be maintained from between about 90 to about 99.5 percent.

As in conventional alkylation reactions, the isoparaffin feed should be present in the reaction in substantial excess over that which is theoretically required to alkylate all of the monoolefin charged. A mole ratio of the isoparaffin to the olefin in excess of 4 to 1 is generally maintained. The isoparaffin present in the reactor employed is preferably maintained in at least 50 percent by volume. Isoparaffins having from 4 to 5 carbon atoms per molecule may be employed. The feed may contain predominantly hydrocarbons having the same number of hydrocarbon atoms per molecule. Also, a hydrocarbon fraction containing compounds of varying hydrocarbon chains, such as a refinery $C_4$-$C_5$ fraction, may also be used. An isobutane feed has been found to be particularly desirable.

The monoolefin feed may comprise hydrocarbons having from 3 to 5 carbon atoms per molecule. The feed may predominate in compounds of one carbon chain length or may be a mixture of two or more different carbon chains. A preferred feed comprises a blend of a $C_4$ fraction recovered from the thermal or catalytic cracking of petroleum oils. An advantage of the present invention is that the olefin space velocity may be considerably higher than those previously used. Space velocities in the range of from about 1 to about 25 can be employed, with a range of from 3 to 10 being preferred. Increasing the olefin space velocity provides a faster reaction time, thus allowing a reactor of smaller capacity. This increase is accompanied by a corresponding increase in the heat of reaction.

As previously pointed out, the acid to isoparaffin ratio should be maintained in the range of from about 0.033 to about 0.10. A value of about 0.067 is generally preferred. While acid strengths of from about 90 to 99.5 percent may be used, it is preferred to employ an acid strength of from about 94 to about 99.5 to obtain the maximum benefits of the present invention. While the invention has been described in connection with sulfuric acid, it should be appreciated that other strong acid catalysts could similarly be employed. Representative examples include hydrofluoric acid, hydrofluoric acid-boron trifluoride, fluosulfonic acid, and boron trifluoride-pyrophosphoric acid.

The emulsifying agent or surface active agent should be present in an amount of from 0.2 to 1.5 percent, preferably in an amount of from about 0.6 to 1 percent based upon the total weight of the acid. As the amount of emulsifying agent is reduced, the dispersion of the acid in the hydrocarbon continuous phase tends to be susceptible to breaking so as to thereby yield poor quality alkylate. On the other hand, increasing the amount of emulsifying agent present beyond the range previously indicated tends to establish an emulsion that is so stable that the alkylate product cannot be readily removed. Continued contact of the alkylate product with the acid catalyst forms undesirable side products. The range set forth has generally been found suitable for forming an emulsion stable enough to allow the formation of high quality alkylate yet without also forming substantial and undesirable by-products. Stearic acid and metal stearates such as sodium stearate are preferred. However, many other surface active agents may be employed, for example the metal salts of alkyl sulfonic acids, dilute ammonium salts, and long chain polyethers.

The process of the present invention may be carried out at temperatures in the range of from about 32° F. to about 100° F. The temperatures employed may be higher than those conventionally used. This, of course, decreases the amount of refrigeration that must be used to maintain the proper temperatures. Temperatures in the range of from about 40 to about 75° F. are preferred.

In FIG. 1, there is shown a schematic view of one reactor that may be used to carry out the alkylation process of the present invention. To this end, there is provided a reactor 10 containing mixing zones 12 and 14, each defined by a cylindrical cup 16, 16' enclosed on the bottom and open on the top.

The sulfuric acid feed is added to the reactor through line 18 from a source not shown and forms a layer on the bottom of the reactor. The acid may suitably occupy from about 3 to about 12 percent by volume of the reactor. The isoparaffin feed is supplied through a line 20 from a source not shown. Sufficient isoparaffin should be added to give an acid-hydrocarbon ratio within the range hereinbefore set forth, i.e.—0.033 to 0.10.

The sulfuric acid is pumped from the bottom of the reactor to the mixing zones 12 and 14 by pumps 22 and 22' at a rate sufficient to form a thin layer of acid at the bottom of the zones. The zones are divided by a weir 24 that has a height extending above the layer of acid. To maintain the strength of the acid that is fed to the mixing zone 14 at the proper level, a pump 26 may be included to transfer acid from below the mixing zone 12 to the acid reservoir below mixing zone 14.

The olefin feed is introduced through line 28 from a source not shown and is introduced into mixing zones 12 and 14 through lines 30 and 32, respectively.

In accordance with one feature of the present reactor, downthrust propellers 34 and 34' are positioned in the isoparaffin continuous phase so as to force the isoparaffin downward at a high velocity. The isoparaffin impinges on the surface of the acid and breaks it up into fine droplets forming a hydrocarbon continuous emulsion that settles rapidly as soon as it leaves the zone of mechanical mixing. The olefin is added just above the propeller and the emulsion spills out the top of the mixing zone following reaction. The reactor may be cooled to the temperature desired by evaporation and recondensation of the isoparaffin feed or by other conventional cooling means.

The spent acid may be removed from the reservoir feeding mixing zone 14 through line 36. Also, the product may be removed through line 38, either continuously or intermittently.

If desired, to make more efficient use of the spent acid, more than one reactor may be employed. In that event, the acid is passed through line 36 to the next reactor and fresh olefin feed is added to the mixing zones as hereinbefore described to effect alkylation.

The following examples illustrate the advantages of the process of the invention. These examples are merely illustrative of the invention and are not in limitation thereof.

EXAMPLE 1

Three runs were carried out in a batch reactor to alkylate isobutane with a mixed olefin consisting of 35 percent isobutylene and 65 percent butene-2 in the presence of varying strengths of sulfuric acid.

The reactor was equipped with baffled liners and a downthrust propeller. The sulfuric acid, together with emulsifying agent or agents which were added, was charged and then the isobutane was added. The contents were stirred at 1800 r.p.m. with the propeller located just above the acid layer while the olefin feed stream was charged. The temperature was maintained at 50° F.

The data are presented in the following Table 1:

TABLE I

| | Run Number | | |
|---|---|---|---|
| | 1 | 2 | 3 |
| Conditions: | | | |
| Acid strength, percent | 93.6 | 99 | 115 |
| Acid/hydrocarbon ratio | 0.066 | 0.066 | 0.066 |
| Olefin space velocity | 3.0 | 3.0 | 3.0 |
| Emulsifying agent, wt. percent | [2]0.8 | [2]0.8 | [3]0.4, 2.6 |
| Results: | | | |
| $C_5$+yield, weight percent based upon the weight of olefin charged | 183 | 195 | 158 |
| Octane Number, research | 95.1 | 96.2 | 93.6 |
| Acid decline, percent | 8.4 | 5.5 | 24.7 |
| Composition of product percent: | | | |
| Isopentane | 9.7 | 7.6 | 8.5 |
| 2,3-DMB plus 2-MP | 8.8 | 6.9 | 7.6 |
| 2,4-DMP | 4.1 | 4.0 | 3.0 |
| 2,3-DMP | 2.5 | 2.1 | 2.8 |
| Other | 10.9 | 11.0 | 9.2 |
| 2,2,4-TMP | 17.0 | 25.6 | 11.8 |
| 2,3,4-TMP | 15.0 | 16.8 | 9.4 |
| 2,2,5-TMP plus 2,3,3-TMP | 15.3 | 17.8 | 15.4 |
| Heavy ends (above $C_8$) | 16.7 | 8.2 | 32.3 |

[1] Fuming.
[2] Sodium stearate.
[3] Stearic acid, sodium sulfate, respectively.

EXAMPLE 2

Two runs were carried out using the reactor described in Example 1 using low strength sulfuric acid with only one run containing an emulsifying agent.

The reactor was charged by adding 20 cc. of sulfuric acid and 303 cc. of isobutane. The contents were stirred at 1800 r.p.m. with the propeller placed as in Example 1. An olefin feed, by volume, of 35 percent isobutylene and 65 percent butene-2 was charged at the rate of 1 cc./minute for 90 minutes. Temperature in the reactor was maintained at 50° F.

Data is shown in Table 2:

TABLE 2

| | Run Number | |
|---|---|---|
| | 4 | 5 |
| Conditions: | | |
| Acid strength, percent | 93.6 | 93.6 |
| Acid/hydrocarbon ratio | 0.067 | 0.067 |
| Olefin space velocity | 3.0 | 3.0 |
| Emulsifying agent,[1] wt. percent | None | 0.4 |
| Results: | | |
| $C_5$+yield, weight percent based upon the total weight of olefin charged | 180 | 185 |
| Octan Number, research | 93.2 | 94.6 |
| Composition of product: | | |
| Isopentane | 9.9 | 9.6 |
| 2,3-DMB plus 2-MP | 8.6 | 8.8 |
| 3-MP | 0.8 | 0.7 |
| 2,4-DMP | 3.7 | 4.1 |
| 2,3-DMP | 2.3 | 2.3 |
| Other | 1.6 | 1.4 |
| 2,2,4-TMP | 13.8 | 16.4 |
| DMH | 6.8 | 7.1 |
| 2,3,4-TMP | 11.0 | 13.9 |
| 2,2,5-TMH plus 2,3,3-TMP | 16.7 | 16.8 |
| Heavy ends (above $C_8$) | 24.8 | 19.2 |

[1] Sodium sterate.

EXAMPLE 3

Additional runs were carried out using the reactor and the general process described in Example 1 with varying amounts of emulsifying agents being added to the sulfuric acid charge.

Following charging of the reactor with sulfuric acid and then isobutane, the contents were stirred at 1800 r.p.m. while an olefin stream of 35 percent isobutylene and 65 percent butene-2 was added. The temperature was maintained at 50° F.

The data are shown in Table 3:

TABLE 3

| | Run Number | | |
|---|---|---|---|
| | 6 | 7 | 8 |
| Conditions: | | | |
| Acid strength, percent | 99 | 99 | 99 |
| Acid hydrocarbon | .067 | .067 | .067 |
| Olefin space velocity | 3.0 | 3.0 | 3.0 |
| Emulsifying agent,[1] wt. percent | 0 | 0.8 | 2.0 |
| Results: | | | |
| C$_5$+ yield | 186 | 195 | 178 |
| Octane Number, research | 92.4 | 96.2 | 94.7 |

[1] Sodium stearate.

EXAMPLE 4

Using the reactor of Example 1, additional runs were carried out over a range of acid to hydrocarbon ratios.

In each run, the reactor was charged with sulfuric acid and then isobutane. The contents were stirred at 1800 r.p.m. while an olefin stream of 35 percent isobutylene and 65 percent butene-2 was added. The temperature was maintained at 50° F. The acid strength was 99 percent.

Runs 9 through 13 contained 0.8 percent by weight of stearic acid.

The remaining data are shown in Table 4:

TABLE 4

| | Olefin space velocity | Acid hydrocarbon ratio | Octane Number |
|---|---|---|---|
| Run Number: | | | |
| 9 | 6.0 | 0.033 | 95.2 |
| 10 | 3.0 | 0.067 | 96.2 |
| 11 | 1.0 | 0.20 | 90.8 |
| 12 | 0.33 | 0.60 | 89.4 |
| 13 | 0.2 | 1.0 | 88.5 |
| 14 | 3.0 | 0.067 | 92.4 |
| 15 | 1.0 | 0.20 | 92.4 |
| 16 | 0.33 | 0.60 | 93.4 |
| 17 | 0.2 | 1.0 | 94.1 |

The data are also graphed in FIG. 2. As can be seen in the runs containing an emulsifying agent, the octane number increases to a peak at an acid/hydrocarbon ratio of 0.067 and then declines as the ratio increases and the acid becomes the continuous phase. When no emulsifier was added, increasing acid/hydrocarbon ratios resulted in increasing octane numbers.

EXAMPLE 5

Using the reactor of Example 1, further runs were made with acid as the continuous phase and comparative runs were made with hydrocarbon as the continuous phase.

In all runs, surfuric acid and then isobutane was charged. An olefin stream of 35 percent isobutylene and 65 percent butene-2 was added while the contents were stirred at 1800 r.p.m. in the hydrocarbon phase. When the acid was the continuous phase, the propeller was submerged in the acid layer and stirred at 1000 r.p.m.

The data are shown in Table 5:

TABLE 5

| | Run Number | | | | |
|---|---|---|---|---|---|
| | 18 | 19 | 20 | 21 | 22 |
| Conditions: | | | | | |
| Continuous phase | ([1]) | ([1]) | ([2]) | ([2]) | ([2]) |
| Acid strength, percent | 97 | 99 | 99 | 99 | 99 |
| Acid/hydrocarbon ration | 1.0 | 1.0 | 0.067 | 0.067 | 0.067 |
| Temperature, ° F | 50 | 50 | 50 | 50 | 75 |
| Olefin space velocity | 0.2 | 0.2 | 3.0 | 3.0 | 3.0 |
| Emulsifying agent [3] wt. percent | None | None | None | 0.8 | 0.8 |
| Results: | | | | | |
| Yield of C$_5$+ wt. percent based upon weight of olefin charged | 199 | 196 | 186 | 195 | 193 |
| Octane Number, research | 96.2 | 94.1 | 92.4 | 96.2 | 94.9 |
| Acid dilution factor | 0.26 | 0.21 | 0.09 | 0.11 | 0.13 |

[1] Acid.
[2] Hydrocarbon.
[3] Sodium stearate.

Thus, as has been seen, the present invention provides an improved alkylation process that combines lower acid consumption with a more selective alkylate product. If desired, the process may be carried out at higher temperatures than those conventionally used so as to decrease the amount of refrigeration that is necessary. Additionally, through maintenance of the critical combination of acid/hydrocarbon ratio and emulsifier concentration according to the present invention, a significantly increased space velocity for the olefin feed may be used. More compact reactors can then be used without sacrificing production.

I claim as my invention:

1. In a process of reacting isoparaffins with monoolefins in the presence of a sulfuric acid catalyst having an acid strength of from about 90 to about 99.5 percent to produce alkylated isoparaffins, the improvement comprising maintaining a sulfuric acid to isoparaffin ratio of from 0.033 to 0.10, said sulfuric acid having added thereto from about 0.2 to about 1.5 percent, based upon the weight of said sulfuric acid, of an emulsifying agent.

2. The process of claim 1 wherein said isoparaffin contains from 4 to 5 carbon atoms per molecule and the olefin contains from 3 to 5 carbon atoms per molecule.

3. The process of claim 1 wherein said isoparaffins include isobutane.

4. The process of claim 1 wherein said olefins include isobutylene.

5. The process of claim 1 wherein said olefins include butene-2.

6. The process of claim 1 wherein said isoparaffin is isobutane and said olefin is a mixture, by volume, of about 35 percent isobutylene and about 65 percent butene-2.

7. The process of claim 1 wherein said emulsifying agent is sodium stearate.

8. The process of claim 1 wherein said sulfuric acid has an acid strength of from 94 to 99.5 percent.

9. The process of claim 1 wherein the temperature is maintained from about 40° F. to about 100° F.

10. The process of claim 8 wherein said acid to isoparaffin ratio is maintained at about 0.067 and said emulsifying agent is present in an amount of about 0.8 percent.

References Cited

UNITED STATES PATENTS

| 2,365,426 | 12/1944 | Molique | 260—683.59 |
| 2,430,673 | 11/1947 | Gibson et al. | 260—683.63 |
| 3,160,674 | 12/1964 | Cannell et al. | 260—683.59 |

DELBERT E. GANTZ, Primary Examiner

G. J. CRASANAKIS, Assistant Examiner

PO-1050
(5/69)

UNITED STATES PATENT OFFICE
CERTIFICATE OF CORRECTION

Patent No. 3,551,514          Dated   December 29, 1970

Inventor(s)   Bernard Lewis Evering

It is certified that error appears in the above-identified patent and that said Letters Patent are hereby corrected as shown below:

Column 2, line 6, "invention" should be -- intention --.

Column 4, line 23, "2.8" should be -- 2.2 --.

Column 4, line 24, "9.2" should be -- 9.8 --.

Column 4, line 62, "sterate" should be -- stearate --.

Column 4, line 60, "13.9" should be -- 13.6 --.

Column 6, line 6, "ration" should be -- ratio --.

Signed and sealed this 13th day of July 1971.

(SEAL)
Attest:

EDWARD M. FLETCHER, JR.
Attesting Officer

WILLIAM E. SCHUYLER, JR.
Commissioner of Patents